United States Patent [19]

Ono

[11] Patent Number: 5,389,930
[45] Date of Patent: Feb. 14, 1995

[54] POWER SAVING TYPE MULTI-BAND MICROWAVE DETECTOR

[75] Inventor: Hisao Ono, Okazaki, Japan

[73] Assignee: Yupiteru Industries Co., Ltd., Tokyo, Japan

[21] Appl. No.: 45,103

[22] Filed: Apr. 12, 1993

[30] Foreign Application Priority Data

Apr. 14, 1992 [JP] Japan .................................. 4-094505

[51] Int. Cl.6 .............................................. G01S 7/285
[52] U.S. Cl. .................................... 342/20; 455/343
[58] Field of Search ................... 342/20 AU; 455/343

[56] References Cited

U.S. PATENT DOCUMENTS

| | | | |
|---|---|---|---|
| 4,622,553 | 11/1986 | Baba et al. | |
| 4,630,054 | 12/1986 | Martinson | |
| 4,935,742 | 6/1990 | Marin | 342/13 |
| 4,954,828 | 9/1990 | Orr | |
| 4,977,611 | 12/1990 | Maru | 455/161 |
| 5,649,884 | 9/1991 | Jaeger et al. | 342/20 |

Primary Examiner—Gilberto Barro, Jr.
Attorney, Agent, or Firm—Wenderoth, Lind & Ponack

[57] ABSTRACT

A power-saving type multi-band microwave detector is operable in a high sensitivity mode and a low sensitivity mode for achieving higher sensitivity for both non-modulated and modulated microwaves to make the detecting operation reliable without causing significant increase of power consumption. The power-saving type multi-band microwave detector includes a receiver circuit including a local oscillator for generating an oscillation output and means for sweeping the frequency of the oscillation output over a predetermined reception band, a power supply for periodically supplying a power for the receiver circuit to maintain the latter active while the power is supplied, and control circuit for controlling the receiver circuit and the power supply means for an intermittent microwave receiving operation. The control circuit operates the receiver circuit and the power supply in a first mode having a higher sensitivity and higher power consumption and a second mode having a lower sensitivity and lower power consumption, and the control means periodically performing the first mode at a lower frequency than the second mode.

6 Claims, 3 Drawing Sheets (A)

(B)

POWER SAVING TYPE MULTI-BAND MICROWAVE DETECTOR

BACKGROUND OF THE INVENTION

1. Field of the Invention

The present invention relates generally to a microwave detector for detecting a microwave transmitted from a specific source, such as a measurement equipment. More specifically, the invention relates to a microwave detector which may reduce power consumption by intermittent operation of a receiver circuit.

2. Description of the Related Art

Multi-band microwave detectors, such as so-called radar detectors which are adapted to detect microwaves transmitted from radar type speed measurement alarm equipment, have been known in the prior art. For example, U.S. Pat. No. 4,622,553, issued on Nov. 11, 1986 to Baba et al., U.S. Pat. No. 4,630,054, issued on Dec. 16, 1986 to Martinson, U.S. Pat. No. 4,954,828, issued on Sep. 4, 1990 to Orr disclose radar detectors of the type that the present invention is directed. Typical traffic monitoring radar type speed measuring equipment (hereinafter referred to as "radar") employ microwave in a plurality of frequency bands, i.e. 10 GHz band (X band), 24 GHz band (K band) and 35 GHz band (Ka band). Typically, there are two types of the radars employed for traffic speeding control. One type of the radar employs a continuous wave type speed measuring equipment which continuously transmit the microwave. The other radar employs a pulse-modulation type speed measuring equipment which transmits a pulse-modulated microwave.

A microwave detector, so-called radar detector, typically employs a super heterodyne type receiver circuit for receiving microwaves and discriminating a specific microwave in a specific band transmitted from the radar for generating an alarm by way of turning ON of a buzzer or LED indicator or so forth. In the case of the normal type microwave detector which is powered by an external power source, the super-heterodyne receiver circuit and other signal processing circuits may operate constantly without fear of exhausting the power source. Therefore, in this case, sweeping of an output frequency of a local oscillator is performed continuously in a cyclic manner. On the other hand, in the case of a battery powered microwave detector employing an installed battery or a solar battery, sweeping of the output frequency of the local oscillator is performed intermittently with a given interval in order to save power consumption.

As can be naturally understood, the power consumption will become smaller by employing a longer interval between the output frequency sweeping periods in the microwave detector. In the typical power-saving type microwave detector, a 10 msec active period is provided with a 490 msec resting interval. Therefore, the typical microwave detector will repeat the 10 msec active period and 490 msec resting interval in a cyclic manner. With such an operation timing, there is no problem in detecting a continuous, non-modulated microwave. On the other hand, it may significantly lower a detecting certainty for a pulse-modulated microwave transmitted from the pulse-modulation type radar, which pulse-modulated microwave typically has a pulse width of 50 msec. Namely, since the 1 0 msec active period is repeated with every 500 msec, a certainty of overlapping of the antenna input and the active period of the microwave detector becomes substantially low.

In order to certainly detect the pulse-modulated microwave with 50 msec of pulse width, it becomes necessary to set the period of cyclic operation smaller than or equal to 50 msec. However, on the other hand, when the resting interval is shortened for achieving the cyclic period shorter than or equal to 50 msec with maintaining the 10 msec active period, the power to be consumed is significantly increased. On the other hand, in order to maintain the power consumption level comparable to the timing of 10 msec active state with 490 msec resting interval, the active period has to be about 1 msec.

In case of the multi-band microwave detector, it is required to sweep the frequency of the oscillator within a predetermined frequency range within every active period in order to achieve desired reception band width. Reduction of the active period from 10 msec to 1 msec thus means to accelerate the sweeping speed at a 10 times higher speed. However, since the sweeping speed is limited by the characteristics of an intermediate frequency filter in the super-heterodyne receiver circuit, the characteristics of a filter in an audio stage following detection output. Namely, when the sweep speed is set at an excessively higher speed, the reception sensitivity may be lowered in inverse proportion to the sweeping speed.

In general, the output level of the pulse-modulation type radar is high, and while the output level of the continuous wave type speed radar is low. If the sweeping speed is set at an extremely high speed to lower the reception sensitivity, the detecting sensitivity for the non-modulated continuous microwave becomes unacceptably low to degrade reliability while the pulse-modulated microwave can be detected for a high level.

SUMMARY OF THE INVENTION

In view of the difficulties in the prior art, it is an object of the present invention to provide a power-saving type multi-band microwave detector which can achieve high detection sensitivity for detecting both of a non-modulated continuous wave type microwave and a modulated microwave while achieving low power consumption.

In order to accomplish the above-mentioned and other objects, a power-saving type multi-band microwave detector for detecting a microwave, according to one aspect of the invention, comprises:

a receiver circuit for detecting the microwave including a local oscillator for generating an oscillation output and means for sweeping the frequency of the oscillation output over a predetermined reception band;

power supply means for periodically supplying a power for the receiver circuit to maintain the latter active while the power is supplied; and control means for controlling the receiver circuit and the power supply means for an intermittent microwave receiving operation, the control means operating the receiver circuit and the power supply means in a first mode having a higher sensitivity and higher power consumption and a second mode having a lower sensitivity and lower power consumption, and the control means periodically performing the first mode at a lower frequency than that of the second mode.

The first mode may have a substantially equal duty cycle of the active period and resting period to that of the second mode, with longer active period than that of the second mode. In such case, the active period in the first mode is substantially ten times longer than that in the second mode.

In the preferred construction, the control means may include first means periodically acting with a predetermined first period for operating the receiver circuit and the power supply means in the first mode and second means periodically acting with a predetermined second period shorter than the first period for operating the receiver circuit and the power supply means in the second mode. Practically, the first means may include a first power supply control signal generator for generating a first supply control signal for controlling the power supply means with a predetermined first duty ratio with a predetermined first ON period, and a first sweep control signal generator active in synchronism with the first power supply control signal generator for generating a first sweep control signal for controlling a sweep speed of the frequency of the local oscillator, and the second means may include a second power supply control signal generator for generating a second supply control signal for controlling the power supply means with a predetermined second duty ratio with predetermined second ON period which is shorter than the first ON period and a second sweep control signal generator active in synchronism with the second power supply control signal generator for generating a second sweep control signal for controlling the sweep speed of the frequency of the local oscillator.

In such a case, the control means may further comprise mode selecting means for selecting the first and second modes, the mode selecting mode being active in a cycle corresponding the cycle of the second mode for selecting the first mode every given number of cycles.

BRIEF DESCRIPTION OF THE DRAWINGS

The present invention will be understood more fully from the detailed description given herebelow and from the accompanying drawings of the preferred embodiment of the invention, which, however, should not be taken to be limitative of the invention, but are for explanation and understanding only.

In the drawings.

DESCRIPTION OF THE PREFERRED EMBODIMENT

Figure 1:
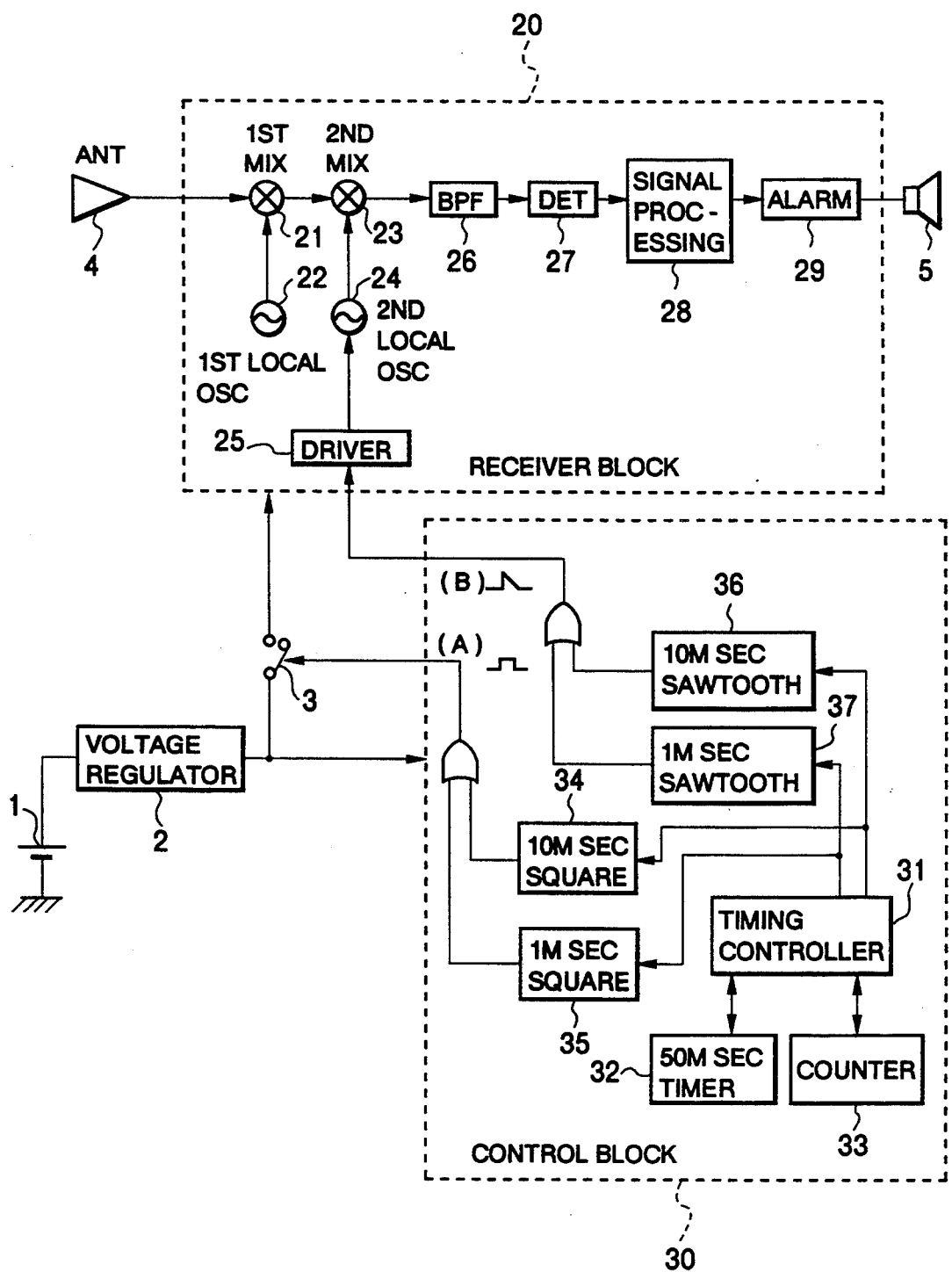
FIG. 1 is a block diagram of the preferred embodiment of a power-saving type multi-band microwave detector according to the present invention.
Figure 2:
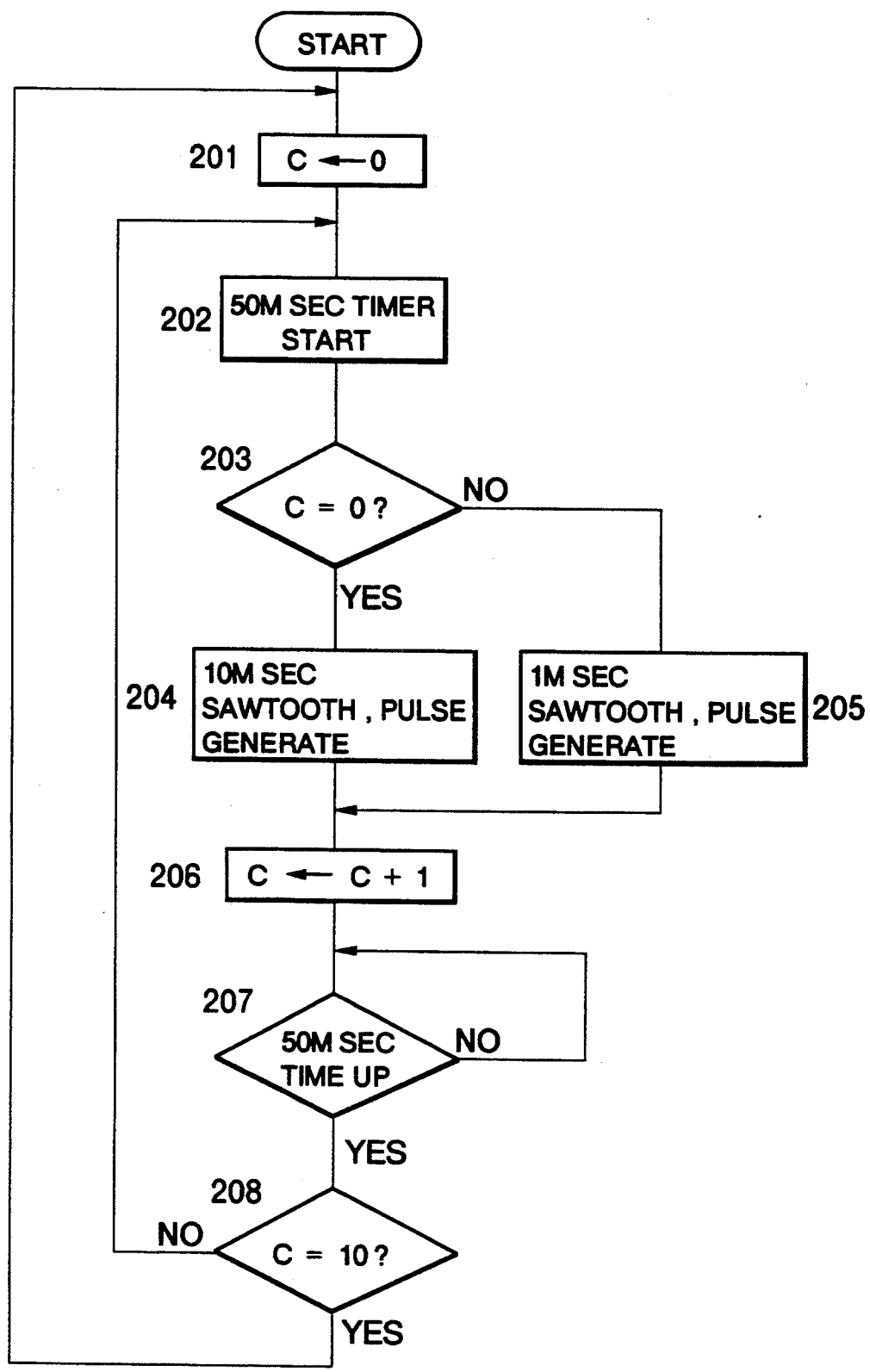
FIG. 2 is a flowchart showing the operation of the microwave detector of FIG. 1 as controlled by a timing controller 31.
Figure 3:
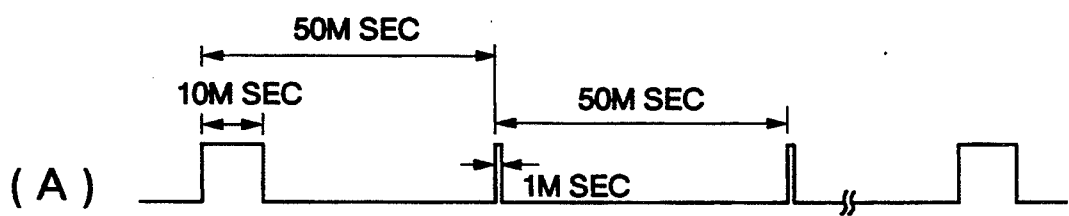
FIG. 3 is a timing chart showing signal waveforms to be generated in the preferred embodiment of the microwave detector of FIG. 1.
Figure 3:
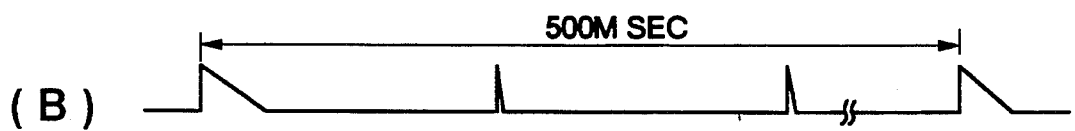

Referring now to the drawings, FIG. 1 illustrates the preferred embodiment of a power-saving type multi-band microwave detector, according to the present invention, and FIGS. 2 and 3 show the operations thereof. The microwave detector generally comprises a receiver block 20 and a control block 30. A battery power source comprising an installed battery or a solar battery 1 is supplied through a voltage regulator 2. The power is constantly supplied to the control block 30. On the other hand, the power is intermittently supplied to the receiver block 20 according to opening and closing of a power supply switch 3.

The receiver block 20 includes a double super-heterodyne type receiver circuit. An antenna input frequency by a horn antenna 4 and an output frequency of a first local oscillator 22 are mixed by a first mixer 21. A resultant first intermediate frequency signal from the first mixer 21 is subject to frequency mixing with an output of a second local oscillator 24 by a second mixer 23. The output of the second mixer 23 is input to a detecting circuit 27 via an intermediate frequency filter 26. The receiver block 20 performs an intermediate operation in the manner set out below. In each cycle of an operation period, the output of the second local oscillator 24 is swept from one given value to the other given value by a sweep driver 25. By this, a predetermined reception band is searched in one cycle of the reception period. A signal processing circuit 28 monitors the output of the detecting circuit 27 to discriminate whether the microwave reception signal is contained in the detection output. When the microwave reception signal is detected, it triggers an alarm circuit 29 for generating an audible alarm through a speaker 5 and/or turning ON a visual LED indicator (not shown in the drawings).

The control block 30 includes a timing controller 31, which controls the intermittent operation of the receiver block 20. The control block 30 further includes a rectangular or square wave pulse generator 34 for generating a rectangular or square pulse having a pulse width of 10 msec and a rectangular or square pulse generator 35 for generating a rectangular or square pulse having a pulse width of 1 msec. The pulse signal generated by either of the pulse generators 34 and 35 serves for defining the operation period of the receiver block 20. The sweep driver 25 for sweeping the frequency of the second local oscillator 24 is controlled by a saw-tooth signal of 10 msec width from a saw-tooth wave generator 36 and a saw-tooth signal of 1 msec width from a saw-tooth wave generator 37. One of the saw-tooth signals is supplied to the sweep driver 25 in synchronism with the corresponding square pulse controlling the power supply switch 3. FIG. 2 shows a process of control to be performed by the timing controller 31 and FIG. 3 shows timings and waveforms of the square pulse signal (A) supplied to the power supply switch 3 and the saw-tooth signal (B) supplied to the sweep driver 25.

The operation of the microwave detector illustrated in FIG. 1 will be discussed with reference to the flowchart of FIG. 2. The timing controller 31 initially clears a counter 33 to zero, and triggers a timer 32 for measurement of an elapsed time of 50 msec (steps 201, 202). Then, a check is performed as to whether the value C of the counter 33 is zero or not (step 203). If the value of the counter 33 is zero as checked at the step 203, the process goes to a step 204, and otherwise to a step 205.

At the step 204, the square pulse generator 34 and the saw-tooth wave generator 36 for a 10 msec operation mode are triggered. By this, the power supply switch 3 is maintained ON for 10 msec. Then, the receiver block 20 is held active for the corresponding period, i.e. 10 msec. While the receiver block 20 is held active, the sweep driver 25 sweeps the frequency of the second local oscillator 24 from one given value to the other given value which defines the desired reception band. In this mode, the receiver block 20 is maintained in the active state for relatively long period and thus the sweep speed of the local oscillator is relatively low. This operational mode will be hereafter referred to as the high sensitivity mode.

On the other hand, at the step 205, the square pulse generator 35 and the saw-tooth wave generator 37 for 1 msec operation mode are triggered. By this, the power supply switch 3 is turned ON for 1 msec for operating the receiver block 20 over the corresponding period, i.e. 1 msec. During this 1 msec period, the sweep driver 25 sweeps the frequency of the second local oscillator 24 from one given value to the other given value. In this mode, the receiver block 20 is held in active state for a relatively short period with relatively higher sweeping speed. This mode will be hereafter referred to as a low sensitivity mode.

Subsequent to the step 204 or 205, the value C of the counter 33 is incremented by 1 at a step 206. Then, a waiting loop is performed for waiting 50 msec at a step 207. After detection of time-up at the step 207, the counter value C of the counter 33 is checked as to whether it reaches 10 at a step 208. If the counter value is less than 10, the process returns to the step 202. On the other hand, if the counter value is equal to 10, the process returns to the initial step 201.

As is clear from the discussion given hereabove, the receiver block 20 operates intermittently with a 50 msec period. Also, among ten cycles of operation, the receiver block 20 is operated in the high sensitivity mode for one cycle and in the low sensitivity mode for the remaining nine cycles.

Therefore, in the power-saving type multi-band microwave detector according to the invention, the high sensitivity mode having the longer operation period is repeated with a long period and the low sensitivity mode having the shorter operation period is repeated with a shorter period so that the non-modulated microwave from the continuous wave type speed radar having a relatively low output level can be certainly detected in the high sensitivity mode and the pulse-modulated microwave from the pulse modulation type speed radar with a relatively high output level can be certainly detected in the low sensitivity mode which is performed more frequently with a shorter interval. Therefore, according to the present invention, with maintaining the ratio of the active period to the resting interval substantially comparable with that in the prior art, higher sensitivity for both of the non-modulated and modulated microwaves can be achieved to make the detecting operation reliable.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments are within a scope encompassed and equivalents thereof with respect to the features set out in the appended claims.

What is claimed is:

1. A power-saving type multi-band microwave detector for detecting a microwave, comprising:

a receiver circuit, for detecting said microwave, including a local oscillator for generating an oscillation output and means for sweeping the frequency of said oscillation output over a predetermined reception band;

power supply means for periodically supplying a power for said receiver circuit to maintain said receiver circuit active while the power is supplied thereto; and control means for controlling said receiver circuit and said power supply means for an intermittent microwave receiving operation, said control means periodically operating said receiver circuit and said power supply means in a first mode having a higher sensitivity and higher power consumption and a second mode having a lower sensitivity and lower power consumption, wherein an operational period of each periodic first mode is longer than an operational period of each periodic second mode, and wherein said control means periodically performs said second mode a plurality of time for each periodically performed first mode.

2. A power-saving type multi-band microwave detector as set forth in claim 1, wherein each periodically performed said first mode and said second mode includes an active period and a resting period and wherein said control means controls said receiver circuit and said power supply means such that a time duration of each periodically performed first mode is the same as that for a plurality of periodically performed second modes and such that the active period of each periodically performed first mode has a longer duration than the active period of each periodically performed second mode.

3. A power-saving type multi-band microwave detector as set forth in claim 2, wherein the duration of said active period in said first mode is substantially ten times longer than that in said second mode.

4. A power-saving type multi-band microwave detector as set forth in claim 1, wherein said control means includes first means periodically acting with a predetermined first period for operating said receiver circuit and said power supply means in said first mode and second means periodically acting with a predetermined second period which is shorter than said first period for operating said receiver circuit and said power supply means in said second mode.

5. (Amended) A power-saving multi-band microwave detector as set forth in claim 4, wherein said first means includes a first power supply control signal generator for generating a first supply control signal for controlling said power supply means with a predetermined first duty ratio with a predetermined first ON period, and a first sweep control signal generator active in synchronism with said first power supply control signal generator for generating a first sweep control signal for controlling a sweep speed of the frequency of said local oscillator, and said second means includes a second power supply control signal generator for generating a second supply control signal for controlling said power supply means with a predetermined second duty ratio with a predetermined second ON period which is shorter than said first ON period, and a second sweep control signal generator active in synchronism with said second power supply control signal generator for generating a second sweep control signal for controlling the sweep speed of the frequency of said local oscillator.

6. A power-saving type multi-band microwave detector as set forth in claim 5, wherein said control means further comprises mode selecting means for selecting said first and second modes, said mode selecting means being active in a cycle corresponding the cycle of said second mode for selecting said first mode every given number of cycles.

* * * * *